Sept. 26, 1961 W. L. HYDE 3,001,449
OPTICAL SYSTEM
Filed Sept. 30, 1957 2 Sheets-Sheet 1
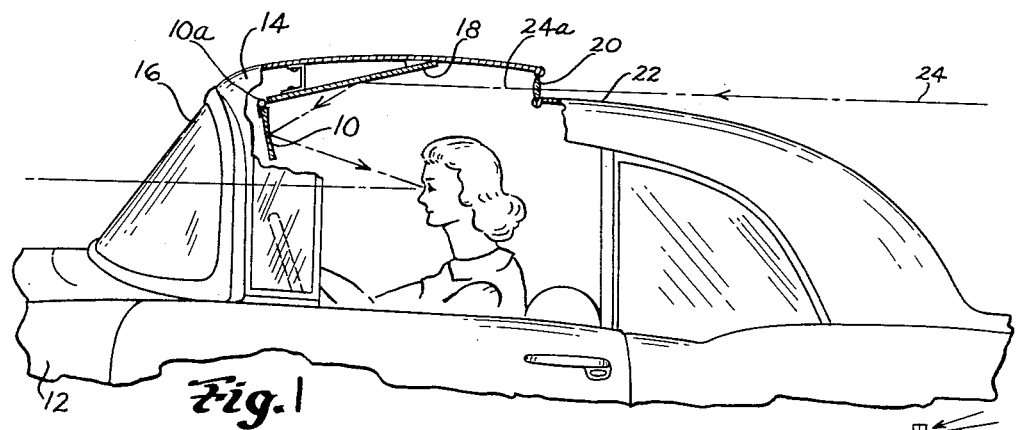
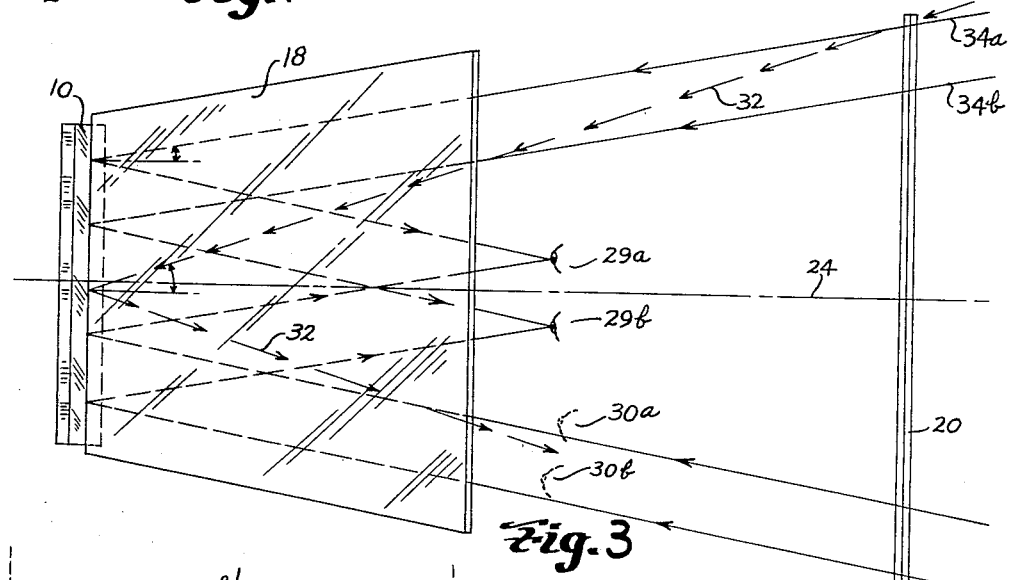
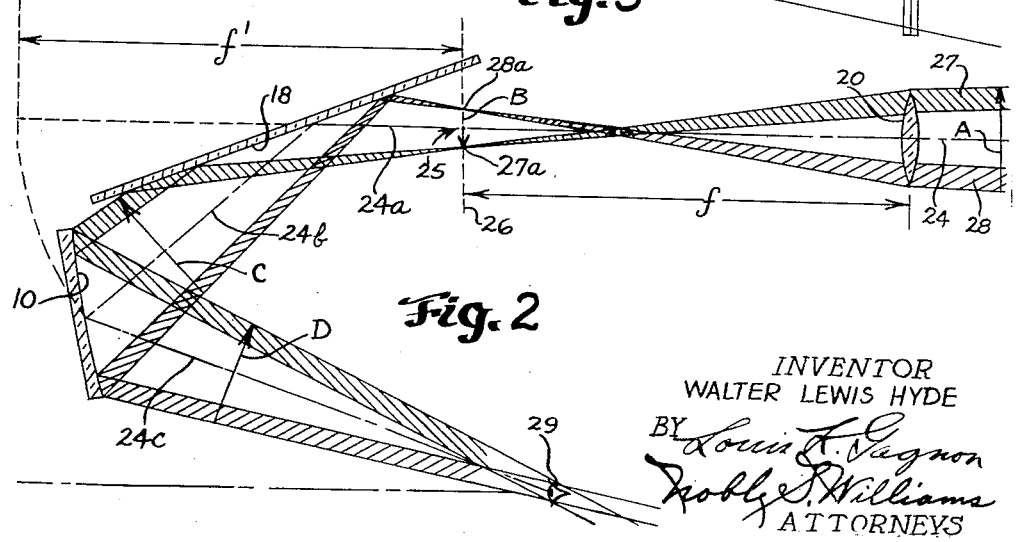
INVENTOR
WALTER LEWIS HYDE
BY
ATTORNEYS Sept. 26, 1961 W. L. HYDE 3,001,449
OPTICAL SYSTEM
Filed Sept. 30, 1957 2 Sheets-Sheet 2
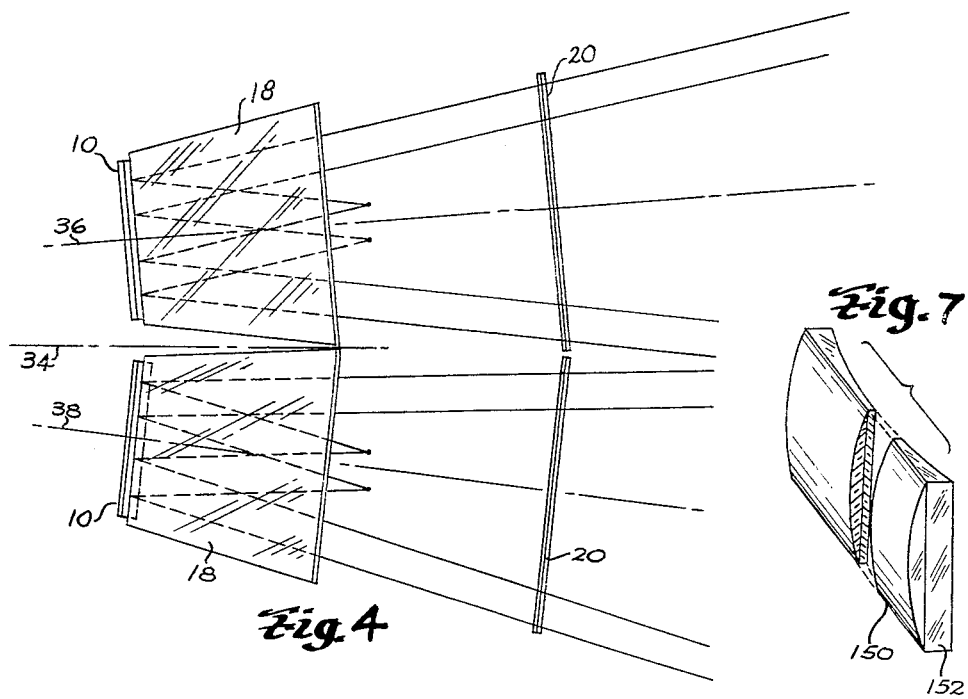
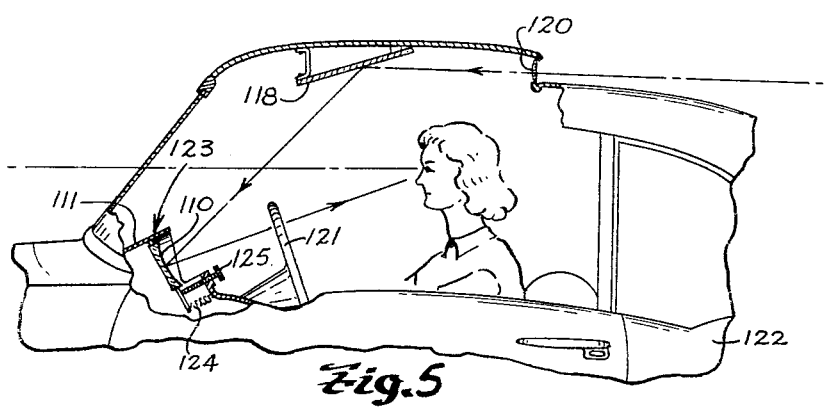
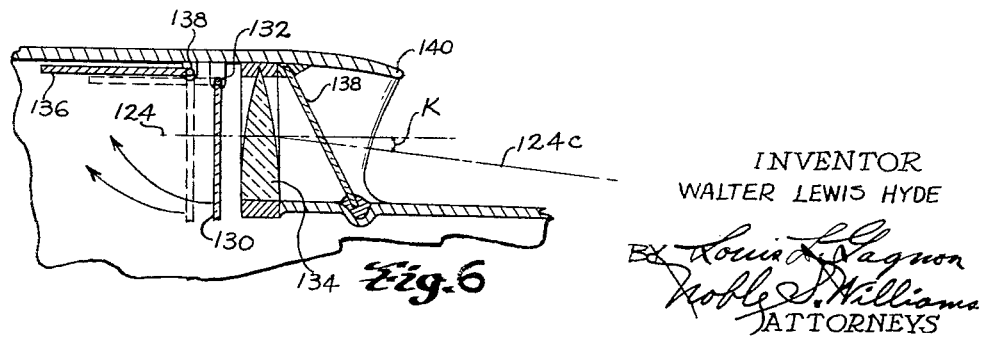
INVENTOR
WALTER LEWIS HYDE
ATTORNEYS United States Patent Office 3,001,449
Patented Sept. 26, 1961

3,001,449
OPTICAL SYSTEM
Walter Lewis Hyde, East Woodstock, Conn., assignor to American Optical Company, Southbridge, Mass., a voluntary association of Massachusetts
Filed Sept. 30, 1957, Ser. No. 687,014
16 Claims. (Cl. 88—86)

This invention relates to improvements in rear-vision optical systems constructed and arranged for use in automobiles, trucks, airplanes, and the like. More particularly, the invention relates to optical systems for such purposes constructed and arranged to provide a relatively large, unobstructed, and realistic appearing rear field of view for the driver or other occupants of the vehicle.

The ordinary centrally located rear-view mirror within a conventional automobile at the present time does not provide as good a field of view to the rear of the vehicle as might be desired. At best, it provides a restricted field of view which is very much limited both in the lateral and the vertical directions thereof. Merely increasing the dimensions of this mirror, furthermore, will not satisfactorily increase the field of view for the driver, for example, since the field will still be limited or obstructed by the size of the rear window of the vehicle through which the driver must look while using the mirror. Not only is the driver's rear field of view restricted, but another condition which is of great importance is the fact that in such an arrangement "blind areas," at opposite sides of this restricted field of view, in a conventional rear-view mirror arrangement exist so that cars, for example, following closely behind the driver's car may actually be near but still completely concealed from view by a passenger in the center of the seat, or by rear corner portions of the car. Such conditions, of course, at times create very dangerous driving conditions. For instance, the second car may actually be close and about to pass the driver's car without the driver being aware of the condition, even though he may glance into his rear-view mirror before starting to slow down, turn, or even pull out of line to pass cars ahead of his own car.

Door-post mounted mirrors have additionally been employed in order to give drivers a more complete view of the road to the rear. However, even though such a mirror may supplement the centrally mounted mirror, in that it would also give a view rearwardly along one side of the vehicle, nevertheless, it would be considerably spaced from the centrally located mirror and, accordingly, it would be necessary to look alternately in different directions when attempting to observe all road conditions by the use of these mirrors. Thus, even though together a somewhat improved driving condition might be obtained, nevertheless, two such mirrors jointly are not entirely satisfactory.

In certain instances, both centrally mounted mirrors or door-post mounted mirrors, have been slightly convexly curved in order to increase somewhat their lateral fields of view but such has not been entirely satisfactory since while a wider field of view has been obtained, nevertheless, the resulting images have been reduced in size and appreciably distorted with the result that the drivers of vehicles so equipped could not immediately determine by glancing into the mirror just how far away, for example, vehicles and other objects in his rear vision mirror actually were.

Improved rear-view optical systems of the present invention, on the other hand, are of such construction and arrangement that not only is a large realistic appearing rear field of view provided the driver (or other user of the system), but also the system is of such improved construction and design that no structural parts of the vehicle or occupants within the vehicle will normally interfere in any way with the view being obtained by the driver, or other occupant, for which this system is intended. Furthermore, the construction and arrangement of parts are such that the entire field of view can be seen as a mirror-like image in true or normal size and proportions, as if same were being provided by a conventional plane rear-view mirror, (or when desired, the system can be modified slightly to give a magnified or diminished image). In addition, the view is binocular and stereoscopic perception of depth is preserved.

Furthermore, the improved optical system is of such a character that only a few relatively inexpensive optical parts or elements are required and these can be incorporated into an automobile or vehicle design easily and economically. Additionally, when the improved optical system is provided in a vehicle and is to be used by different users thereof, only a very slight and easily effected adjustment of the optical parts will be needed to satisfy the different requirements of the users.

A rear-view or rear-vision optical system made in accordance with the teachings of the present invention provides a relatively wide field of view, when considered both in the horizontal and the vertical directions thereof, in substantially true proportions and in normal size, even though its optical parts in one sense act like an astronomical telescope system in focusing substantially parallel light rays from the object field at a focal plane in said system and thereafter directing these rays as parallel rays toward an eye point in said system. However, considered in another sense, the system is like an ordinary rear view mirror in that no reversal of image takes place and, accordingly, different parts of the object field appear to the driver, or user of the system, to come from the direction from which he would normally expect same to come. Thus, the true proportions and proper arrangement of parts of the object field will give the driver the feeling that he is actually observing the view itself.

It is accordingly an object of the present invention to provide an improved and efficient rear-view or rear-vision optical system which may be easily and economically made and incorporated into a vehicle, truck, or the like, and which system will provide a relatively large field of view for the driver or other occupant of the vehicle, and which field of view will appear properly oriented and substantially free from distortion and in substantially true dimensions or, somewhat enlarged or reduced depending upon the requirements of different installations.

It is also an object to provide an optical system of the above character which is so disposed in an automobile or other vehicle that its field of view will be normally in no way obstructed by occupants of the vehicle.

It is another object of the present invention to provide an optical system of the above character in a vehicle or the like which will provide the relatively large and realistic view mentioned above and which system in the vehicle is of such a construction and arrangement that it will in no way interfere with the usual duties of a driver operating the vehicle.

It is an additional object of the invention to provide for an optical system of the character described means whereby same may be readily adjusted to the individual requirements of different persons using same; as well as conveniently located means for controlling the character and intensity of the image being provided by the system.

Other objects and advantages of the invention will become apparent from the detailed description which follows when taken in conjunction with the accompanying drawings, in which:

FIG. 1 is a side elevational view of a vehicle embodying an optical system of the present invention, parts of said vehicle being broken away to better show the details of construction of said system;

FIG. 2 is a sketch on a somewhat enlarged scale showing essential components of an optical system embodying the invention and showing the paths of certain light rays thereof for a better understanding of the invention;

FIG. 3 is a diagrammatic plan view of an optical system like that of FIG. 2 and indicating the direction of certain light rays passing therethrough;

FIG. 4 is a plan view of a modified form of the invention and showing a pair of optical systems somewhat like that shown in FIGS. 1 and 3, but one system arranged for use by the driver and the other by an adjacent passenger;

FIG. 5 is a side elevational view somewhat like that in FIG. 1 but showing a modified form of the invention;

FIG. 6 is an enlarged fragmentary sectional view showing certain parts of the optical parts in detail; and FIG. 7 is a perspective view of a modified optical component which may be employed in a rear view system embodying the present invention.

Referring to FIG. 1 in detail, it will be seen that an improved rear view or rear vision optical system embodying the present invention is shown and comprises a concavely cylindrically curved mirror 10 mounted in an automobile 12 near a forward roof portion 14 thereof and adjacent the upper edge of a windshield 16, so that the driver of the vehicle by glancing upwardly and forwardly may look into this mirror. In optical alignment with cylindrically curved mirror 10 is a relatively large plane mirror 18 which is carried in a nearly horizontal position adjacent the roof portion 14 of the vehicle, and somewhat rearwardly of this plane mirror 18 is disposed a cylindrically shaped convergent lens 20. Lens 20 is, in fact, shown positioned between the rear edges of the front roof portion 14 and a rear roof portion 22 and these two roof portions are arranged in such stepped relation to each other that a substantially horizontal portion 24a of an optical axis 24 extending through lens 20 is located above rear roof portion 22 and below forward roof portion 14.

If reference is also made to FIG. 2 wherein the parts 10, 18 and 20 are shown in a vertical sectional view and somewhat enlarged, it will be seen that the cylindrical lens 20 which may be termed an objective is so disposed that substantially parallel light rays from an object field to the rear of the vehicle will pass through the lens 20 in entering the interior of the vehicle and will be brought to a focus by this positive lens 20 substantially at a principal focal plane 26 indicated at a focal distance $f$ forwardly of the lens 20. It follows, therefore, that light rays parallel to the axis 24 will be brought to a focus at the principal focus or axial point 25 while parallel light rays from the upper part of the object field (as indicated at 27) will be focused below the axis at focal point 27a. Also parallel light rays from the lower part of the object field (as indicated by rays 28) will be focused above the axis at focal point 28a.

It will be clear from this figure that plane mirror 18 is of such size and so located in the optical system that it will intercept light rays transmitted by the cylindrical lens 20 and reflect same generally downwardly and forwardly toward the concave cylindrical mirror 10. Cylindrical mirror 10 is purposely made of such a predetermined concave curvature that its focal length $f'$ will be substantially equal to $f$ (the focal length of lens 20) and is disposed substantially at this distance from the focal plane 26 as measured along portions 24a and 24b of the optical axis 24.

It will be appreciated from this figure of the drawing that light rays passing through the lens 20 and focused substantially at the plane 26 will be, as indicated by the arrows A and B, inverted. On the other hand, since the cylindrical mirror 10 is disposed substantially at its focal distance from the image plane 26, and since plane mirror 18 is disposed in a sloping position in the path of the rays as they pass forwardly of the focal plane 26 these rays will be not only directed downwardly and forwardly to impinge upon the cylindrical mirror 10 but also will be inverted as indicated by the arrow C. These rays impinging upon mirror 10 so located will be reflected thereby as substantially parallel rays in a downwardly and rearwardly direction along an extension 24c of the optical axis toward the eye 29 of the driver (or other occupant) seated in the vehicle so as to use the rear-vision system, and thus the image which will be observed will appear in an upright position as indicated by the arrow D.

When the curvature of the cylindrical lens 20 and cylindrical mirror 10 are such as to provide in these two optical elements substantially equal focal lengths ($f=f'$) a substantially unit power optical system or telescope will be produced. Not only will the image forming rays provide a visual image in which persons or objects will appear to be of normal size and upright but also will appear in proper lateral arrangement the same as in a conventional rear-view mirror. Or stated differently, the optical system is of such an optical design and arrangement that the eye of the driver will be, in effect, transposed to the axial location of lens 20 so that the image which he will observe will appear to him to be the same as if his eye were actually at such a location 20. Of course, the size of image observed will depend upon other limiting factors of the optical system as will hereinafter appear.

In the preceding paragraphs, the behavior of the light rays from the object field and travelling in a vertical plane including the optical axis 24 has been mainly discussed. If reference is now made to FIG. 3 wherein a plane view of this optical system is indicated, it will be seen that the cylindrical lens 20 is of considerable length and has its major meridian, which may be termed its axial meridian, extending in a transverse direction with reference to axis 24 and this axis extends more or less in the direction of travel of the vehicle 12. Also, note that the plane mirror 18 is of appreciable width or transverse dimension and that the cylindrical mirror 10 is likewise of considerable transverse length and has its axial meridian thus disposed transversely and in parallel relation to that of lens 20. However, as will presently appear, the mirror 10 does not need to be of as great a transverse dimension as is required for lens 20.

It will be readily apparent from the light rays shown in this figure (for example, rays 34a and 34b) that no change in direction occurs as they pass through and beyond lens 20. In other words, lens 20 as considered in FIG. 3 has no power and thus functions merely the same as an ordinary window in admitting the rays to the interior of the vehicle. Also note that cylindrical mirror 10 has no power when considered in this same manner and thus functions merely as an ordinary mirror in reflecting the light incident thereon. Therefore, it will be recognized that the eyes 29a and 29b of the driver, for example, in the position indicated may be directed forwardly toward mirror 10 and when directed toward one side of the cylindrical mirror 10 and then the other side, he will be able to binocularly see all parts of a relatively wide object field included between light rays 34a, 34b on the right and light rays 36a, 36b on the left. And as stated above, the objects will look real and upright. His line of sight, as considered in FIG. 3, will merely be redirected back in "plane-mirror fashion" by mirror 10 toward plane mirror 18 and then toward the cylindrical lens 20 without any reversal of image taking place therein, notwithstanding the fact that at the same time, as shown in FIG. 2, there is an inverting of image produced by lens 20 and a second inverting of image produced by the plane mirror 18. Thus, while it might be considered that the optical system, as viewed in FIG. 2 in a vertical section, constitutes a unit power telescope supplemented by an image inverting element, nevertheless, since only cylindrical and plane elements are used, this system when considered in horizontal section, as in FIG. 3, involves no image enlarging or reducing, nor image inverting, or reversing. Thus, a very material difference exists between the present improved system and systems of former constructions wherein spherical elements or components were used. (It is here specifically noted that if a positive spherical lens and a positive spherical mirror were used in place of lens 20 and mirror 10 respectively of the present improved system, such would not provide the results desired.)

As may be gathered from the preceding description, the extent of the instantaneous field of view which may be obtained in a horizontal direction by a system of the type shown in FIGS. 1–3 is mainly limited by the transverse dimensions of the optical components which may be conveniently employed within an enclosing vehicle. In the system here shown as much as a 12° field may be obtained. However, as indicated by the dotted line eye positions 30a, 30b, it should be appreciated that when special occasions require, the driver (or occupant) of the vehicle may obtain an extra wide lateral field of view to the rear of the vehicle by simply leaning to one side or the other of the center vertical plane of the system. This is indicated by a line of arrows 32. Thus, in the system of FIGS. 1–3, a total effective field of view obtained rearwardly of the vehicle by bobbing of the driver's head to one side and then the other could be as much as 28 degrees. Since the light passing through this system from an object field to the rear of the vehicle is outside the vehicle at all points rearwardly of the cylindrical lens 20, no rear part of the top of the vehicle or of occupants in the front or rear seats of the vehicle will obstruct this view.

The extent of the instantaneous field of view in the vertical direction, however, is different. From the eye position in FIG. 2, the driver may see a fairly large vertical field even though the objective 20 does not appear to be large in its vertical dimension. The reason why such a condition is obtained may not be immediately appreciated by inspection of the drawing, not until it is also recognized that, even though the eye is receiving parallel light originating from the object field, it is, nevertheless, located at such a location with respect to the cylindrical mirror 10 that its conjugate focus is located substantially at the plane of lens 20. Or stated differently, the entrance pupil of the system will lie at the plane of the objective and the size of the exit pupil at or near the driver's eyes will be equal to the full height of the objective. In a sense, it has the same effect as if the driver's eye position were transposed to a position at the plane of the objective.

An advantageous result thus obtained is the fact that should the driver raise or lower his head, a small amount, his eyes will be completely out of line with the light rays from the object field directed toward the eye point 29. Accordingly, at night, for example, the bright lights of an auto following the driver's car closely may be easily completely avoided, if desired. Slight adjustment of the system for different driver's requirements may be obtained by pivoting the mirror 10 vertically about the horizontal axis of pivot means 10a.

In FIG. 4, there is indicated at 34 the approximate center line of the vehicle while at 36 and 38 the optical axis of a pair of optical systems basically like the system already described are shown in side-by-side relation and these two systems are indicated in slightly angled relation to the center line 34. A dual arrangement of this type may be easily arranged to provide not only a rear view for the driver of a vehicle but also a rear view for an occupant riding in a seat beside the driver. An additional advantage to be obtained by such an arrangement, insofar as the driver is concerned, is the fact that he may obtain a more complete view to the left rear of his vehicle by this slightly angled arrangement and, accordingly, may have a better opportunity to observe other following vehicles at a near location and as they start to pass. In such a dual arrangement, it will also be possible to position both systems in parallel relation to the vehicle center line 34, if desired. In either case, it would be possible to tilt the cylindrical mirrors 10 about their respective horizontal pivotal axes to accommodate the requirements of different drivers and different occupants of the vehicle.

In FIG. 5 is shown a rear view optical system somewhat like that of FIG. 1 but in this figure a cylindrical curved mirror 110 is disposed preferably in the dash 111 of a vehicle directly or nearly directly forwardly of the driver and this mirror is arranged to direct the driver's line of sight upwardly towards a plane mirror 118 after which it passes rearwardly and outwardly of the vehicle by way of a cylindrical lens 120. Even though portions of a steering wheel 121 of the vehicle 122 in such an arrangement might seem to be so located as to obstruct a part or parts of the field of view being observed, it has been found in actual use of a vehicle equipped with a system of this type that by very slight movement of the driver's head in an up-and-down or sidewise direction or both, he or she may very easily and almost instantaneously obtain a complete view of all parts of the object field. A distinct advantage obtained by this modified system over that provided by the construction of FIG. 1 resides in the fact that since the light rays incident upon mirror 118 have smaller angles of incidence and reflection, the required mirror area for reflecting and inverting the entire light beam between lens 120 and mirror 110 may be made appreciably smaller. In order to allow the mirror 110 to be adjusted for use by different persons, horizontal hinge means is provided at 123, and to work therewith is a tensioning spring 124 arranged to pull upwardly on the lower edge of the mirror 110 and a thumb screw 125 arranged to press downwardly on a lower part of the mirror. Thus, various angular positions for the mirror 110 can be readily obtained.

In FIG. 6 is shown a laterally elongated light filter 130 pivotally hinged by friction hinge means 132 adjacent the roof of the vehicle and immediately ahead of an objective 134. The purpose of this filter is to reduce, when desired, the brightness or shade of the light being allowed to pass through the optical system. Forwardly of filter 130 is an opaque or translucent screen 136 and this screen is likewise pivotally hinged as by friction hinge means 138 to the roof of the vehicle. Obviously, such a filter and screen can be used immediately ahead of the objective in any of the modified constructions described herein, and thus would be located nearly directly above the head of the person using the associated system. Accordingly, when occasions arise requiring a change in the amount of light being received, it will be an easy and convenient matter for the user to pivot one or both up or down as he or she wishes.

Also shown in FIG. 6 is a cylindrical objective 134 of slightly modified form. While this lens functions like lenses 20 and 120 in vertically converging the light rays transmitted thereby, nevertheless, since lens 134 is really formed by two cylindrically curved surfaces suitably decentered relative to each other, viewed as in FIG. 6 (thus, in effect providing a wedge of refracting medium therebetween), it will also act as a thin prism upon all rays transmitted thereby. Thus, it might be said that that part 124c of the optical axis 124 outwardly of the vehicle is tipped or bent downwardly as indicated by the angle K. Not only will the prismatic effect of this arrangement be such as to allow a view of the road nearer the rear of the vehicle but also this downward bending of the principal rays of the beam may allow a smoother fitting and blending of optical components of the system into roof portions of the car. Of course, a plano-cylindrically curved lens could likewise be formed in effect with a wedge portion so as to bend the axis downwardly. Outwardly of the lens 10, 120, or 134, if desired, a plane sloping window 138 may be used for ease in keeping the exposed outer surface of lens 134 clean and protected.

and a sun shield over this window can easily be provided by merely extending somewhat the rear edge 140 of the upper forward roof portion.

While the focal length $f$ for the cylindrical objective lens (20, 120 or 134) and the focal length $f'$ for the cylindrical mirror (10 or 110) intended to function therewith have been taken as equal to each other so that a unit power optical system will be produced, it is possible to use in a single system such a lens and mirror which do not have equal focal values. Nevertheless, when they are assembled in a system, they would be optically spaced from each other a distance equal to the sum of their focal lengths and under such conditions a vertical elongation or vertical foreshortening of image would be observed through the system. Even though this would actually amount to an image distortion, probably no more than a 30 percent increase or decrease in the vertical dimension of the image would ever be desired in any system.

In FIG. 1, a positive objective lens having two elongated cylindrical curved surfaces is shown and in FIG. 5 an elongated positive objective lens of a plano-cylindrical type is shown. Both of these lenses are convergent lenses, considered in vertical section, and will perform in much the same manner in the optical systems already described. In FIG. 7, however, a modified objective lens construction is shown wherein an elongated positive plano-cylindrical lens element, like that at 20 in FIG. 5, is shown. This lens has a cylindrical refracting surface 150 upon its front face. Upon its rear face may be cemented or otherwise formed a negative cylindrical refracting surface 152 having its axial meridian vertically disposed. Thus, it can be said that thte axial meridians of these two cylindrical lens surfaces 150 and 152 are disposed in planes at right angles to each other.

One purpose for such an additional negative element or negative surface to the objective lens in any of the optical systems already described is to provide a somewhat wider object field of coverage for the driver of the vehicle even though the apparent size of objects in the horizontal direction of the field would be reduced somewhat. When such a negative lens is made a part of the optical system, it would generally be advisable to modify the focal length ($f_o$) of the objective lens 20 and the concave mirror ($f'$) so that $f_o=0.7f'$ or $f_o=0.8f'$, and again separate them by approximately the sum of the focal lengths. The effect of this changed focal power of the elements will be a 20 to 30 percent reduction in image size in the vertical dimensions of objects. Thus, together these two reductions (vertical and horizontal) will produce an image which will not be distorted although it will appear to be from 70 to 80 percent of normal size. Probably a reduction in image sizes of as much as 20 to 30 percent can be tolerated without having the driver of the vehicle experience difficulty in judging distance between his vehicle and others to the rear.

A demagnifying cylindrical telescope of this type will demand a slight accommodation (about 0.3 diopters) of the eye of the driver for best focus in the horizontal meridian, and to avoid astigmatism, the objective and cylindrical mirror should be separated by a distance slightly less than the sum at their focal lengths.

Not only will the width of the object field which can be covered by such a modified system using this negative lens element be increased, it will also be possible to use an objective lens of smaller vertical dimension without reducing the exit pupil, or provide an increase in exit pupil size considered in the vertical direction thereof and, accordingly, a little greater freedom of vertical movement for the eyes of the user at point 29. The height of the exit pupil, $h_{ep}$, is related to the height of the objective $h_o$ by the formula $h_{ep}=h_o/M$ where M is the magnification.

While the optical system of the present invention has been described particularly in connection with its use in an automobile, truck or similar vehicle, it will be readily appreciated that it may be used to advantage in other places and for other purposes wherein an equivalent indirect wide realistic upright mirror-like view of objects to the rear of the user is desired.

Having described my invention, I claim:

1. A rear view optical system for use in a vehicle or the like and providing an upright realistically appearing image at a predetermined eye position in said system, said system comprising a first cylindrically curved positive refracting optical component, a plane mirror and a second cylindrically curved positive reflecting optical component arranged in optical alignment with each other along a common optical axis, said positive optical components having their respective axial meridians extending substantially horizontally and in transverse directions relative to said optical axis so as to be in substantially parallel relation to each other, each optical component having a predetermined focal length and said optical components being axially spaced from each other a distance approximately equal to the sum of their focal lengths, said first optical component being disposed so as to admit light rays from an object field rearwardly of said vehicle and direct same as convergent rays focused at a focal plane intermediate said components, whereby an inversion of said light rays without a side-to-side reversal thereof at said focal plane will be produced, said plane mirror being positioned in said system intermediate said optical components and so angularly disposed as to intercept said rays and invert and direct said rays toward said second optical component, said second optical component being so positioned as to direct said rays toward said predetermined eye position.

2. A combination as set forth in claim 1 wherein said first optical component is in the form of a cylindrically curved lens of appreciable transverse dimension and said second optical component is in the form of a cylindrically curved mirror of appreciable transverse dimensions so that an object field of appreciable extent in the horizontal direction thereof will be provided a user having his eyes adjacent said eye position.

3. The combination as set forth in claim 1 wherein said first and second positive optical components have focal lengths of approximately equal value, whereby a magnification substantially equal to unity will be provided in both the vertical and the horizontal directions in the image being observed from said eye position.

4. The combination as set forth in claim 1 including an opaque screen, and pivotal means in fixed relation to the first cylindrical component of said system, said pivotal means being arranged to movably mount said opaque screen for adjustment from an inoperative position out of the normal path of the light rays travelling through said system to an operative position in said path so as to intercept said light rays, whereby the transmission of said light rays to the eye position of said system may be variably controlled thereby.

5. The combination as set forth in claim 1 including a light filter, and pivotal means in fixed relation to the first cylindrical component of said system, said pivotal means being arranged to movably mount said light filter for adjustment from an inoperative position out of the normal path of the light rays travelling through said system to an operative position in said path so as to intercept said light rays, whereby the intensity of the light rays reaching the eye position of said system may be altered thereby.

6. The combination as set forth in claim 1 including a light filter, an opaque screen, and pivotal means in fixed relation to the first cylindrical component of said system, said pivotal means being arranged to movably mount said light filter and said opaque screen for adjustment from inoperative positions out of the normal path of the light rays travelling through said system to operative positions in said path, whereby the transmission of said light rays to the eye position of said system may be varied or prevented thereby as desired.

7. In a vehicle the combination of a windshield, a roof portion of said vehicle adjacent an upper part of said windshield and extending rearwardly therefrom, a narrow transverse opening formed between vertically spaced front and rear parts of said roof portion, a pair of elongated positive cylindrically curved refracting optical components transversely positioned adjacent said opening and at opposite sides respectively of the longitudinal center line of said vehicle, said optical components being so angularly disposed as to direct light rays from object fields rearwardly of said vehicle along two separate laterally spaced paths into the interior of said vehicle, a pair of image-inverting mirrors positioned in said vehicle forwardly of said refracting optical components respectively so as to intercept the light rays transmitted thereby and direct same as inverted light rays without side-to-side reversal thereof forwardly toward a pair of elongated transversely extending positive cylindrically curved reflecting optical components optically aligned therewith and positioned in said vehicle adjacent laterally spaced parts of said windshield, each refracting optical component and reflecting optical component aligned therewith being spaced from one another along a common optical axis a distance approximately equal to the sum of their respective focal lengths, and said components being so angularly adjustable in vertical planes as to direct the light rays being received thereby generally rearwardly toward laterally spaced eye positions at opposite sides of the center line of said vehicle.

8. A rear view optical system for use in a vehicle or the like for providing a relatively wide angle, upright, realistically appearing image of an object field rearwardly of said vehicle substantially at a predetermined eye position in said vehicle, said system comprising a first cylindrically curved positive optical component, an image-inverting mirror and a second cylindrically curved positive optical component arranged in optical alignment with each other along a common optical axis, said positive optical components having their respective axial meridians extending generally transversely of said vehicle and in substantially parallel relation to each other, the first of said positive optical components being a refracting component positioned adjacent an opening in said vehicle and the second of said positive optical components being a reflecting component positioned in said vehicle adjacent the windshield thereof, each positive optical component having a predetermined focal length, and said optical component being axially spaced from each other a distance approximately equal to the sum of their respective focal lengths, whereby said first optical component admitting light rays from said object field rearwardly of said vehicle will provide an inversion of said light rays without a side-to-side reversal thereof substantially at a focal plane intermediate said components, said image-inverting mirror being positioned in said system between said positive optical components so as to intercept said light rays and provide a second inversion without a side-to-side reversal of said light rays while directing same toward said second positive optical component for reflection thereby to said predetermined eye position.

9. The combination as set forth in claim 8 wherein said first positive cylindrical optical component is a plano-convex lens element and has applied thereto a plano-concave refracting element having a weak cylindrically curved surface thereon and so disposed that its axial meridian extends in a vertical direction.

10. The combination as set forth in claim 8 wherein the focal length of said first positive optical component is from five to thirty percent less in length than the focal length of said second optical component, whereby a controlled degree of magnification may be provided the image in the vertical direction thereof when viewed from said eye position as compared to the unit magnification of said image in the horizontal direction thereof.

11. The combination as set forth in claim 8 wherein said first positive refracting optical component includes, in effect, in addition to its cylindrical curvature a predetermined amount of prism, when considered relative to each vertical longitudinal plane therethrough, with the result that a predetermined vertical deviation will be provided the light rays entering said first component from said object field.

12. In a vehicle the combination of a windshield, a roof portion of said vehicle adjacent an upper part of said windshield and extending rearwardly therefrom, a narrow transverse opening formed between vertically spaced front and rear parts of said roof portion, an elongated cylindrically curved positive refracting optical component positioned adjacent said opening and angularly disposed so as to direct and focus light rays from an exterior object field rearwardly of said vehicle at a focal plane in the interior of said vehicle, an image-inverting mirror positioned in said vehicle so as to intercept said light rays transmitted by said refracting optical component and direct same as inverted light rays without side-to-side reversal thereof toward an elongated cylindrically curved positive reflecting optical component positioned in said vehicle adjacent said windshield, said optical components being spaced from each other along a common optical axis a distance approximately equal to the sum of their respective focal lengths, and having their respective axial meridians extending generally transversely of said axis and in substantially horizontal parallel relation to each other, and said reflecting optical component being so angularly positioned in said system so as to direct the light rays received from said mirror generally rearwardly toward an eye position in said vehicle.

13. The combination as set forth in claim 12 wherein said reflecting optical component is positioned adjacent an upper part of said windshield and the light rays reflected thereby are directed generally downwardly and rearwardly toward a predetermined eye position.

14. The combination as set forth in claim 12 wherein said reflecting optical component is positioned adjacent a lower part of said windshield and the light rays reflected thereby are directed generally upwardly and rearwardly toward a predetermined eye position.

15. A rear-view optical system for use in a vehicle or the like for providing an upright realistically-appearing image at a predetermined eye position in said system, said system comprising an elongated cylindrically curved positive refractive optical component, a plane mirror and an elongated cylindrically curved positive reflecting optical component arranged in optical alignment with each other along a common optical axis, said positive optical components having their respective axial meridians extending substantially horizontally and in a transverse direction relative to said optical axis so as to be in substantially parallel relation to each other, each optical component having a predetermined focal length and said optical components being axially spaced from each other a distance approximately equal to the sum of their focal lengths, said cylindrically curved refracting component being arranged when disposed on said vehicle so as to receive light rays from an object field rearwardly of said vehicle and direct same as convergent focused rays toward a focal plane intermediate said components, whereby an inversion of said light rays without a side-for-side reversal thereof at said focal plane will be produced, said plane mirror and said cylindrically curved reflecting component being so optically aligned and so angular disposed in said system and relative to each other as to intercept the light rays transmitted by said refracting component and provide a second inversion of said light rays without a side-for-side reversal thereof, one of said plane mirror and said reflecting component being the last optical member in said system and so angularly disposed therein as to direct said light rays rearwardly toward said predetermined eye position and the other being located between said last member and said cylindrically curved refracting component, whereby a person using said system and looking toward said last optical member may observe from said eye position a wide substantially undistorated upright and normal appearing mirror-like virtual image of said object field.

16. A rear view optical system for use in a vehicle or the like and providing a wide upright realistically appearing image at a predetermined eye position in said system, said system comprising a first elongated cylindrically curved optical component, a plane mirror and a second elongated cylindrically curved optical component positioned in spaced optically aligned relation to each other along a common optical axis, said first and second elongated cylindrically curved optical components being positive refracting and positive reflecting components respectively positioned in said system rearwardly and forwardly respectively of said plane mirror, said elongated cylindrically curved components having their respective axial meridians generally horizontally disposed in substantially parallel relation to each other and in transverse relation to said optical axis, said elongated cylindrically curved optical components having predetermined substantially equal focal lengths and being axially spaced from each other a distance substantially equal to the sum of their respective focal lengths, said first elongated optical component having appreciable length in the meridional direction thereof and being so positioned in said system and relative to said plane mirror as to receive light rays coming from an object field of appreciable width to the rear of said vehicle and direct same toward said plane mirror, said plane mirror being of such size and so angularly positioned in said system as to invert said light rays without a side-to-side reversal thereof and direct said light rays toward said second elongated optical component, and said elongated second optical component being of such size and so angularly disposed relative to said plane mirror as to direct said light rays received from said plane mirror rearwardly at a suitable vertical angle of tilt toward an eye position a short distance therefrom, whereby a person using said system and looking toward said second component may observe from said eye position a wide substantially undistorted and normal appearing mirror-like virtual image of said object field.

References Cited in the file of this patent

UNITED STATES PATENTS

| | | |
|---|---|---|
| 388,934 | Trapp | Sept. 4, 1888 |
| 1,653,575 | Kirtane | Dec. 20, 1927 |
| 2,017,634 | Newcomer | Oct. 15, 1935 |
| 2,157,138 | Mendez | May 9, 1939 |
| 2,375,887 | Barden | May 15, 1945 |
| 2,942,522 | Merriam | June 28, 1960 |

FOREIGN PATENTS

| | | |
|---|---|---|
| 78,482 | Sweden | Apr. 23, 1932 |
| 1,062,289 | France | Dec. 2, 1953 |